Dec. 15, 1925.
A. C. RANKIN
1,565,497
ANTISKID DEVICE
Filed March 4, 1924
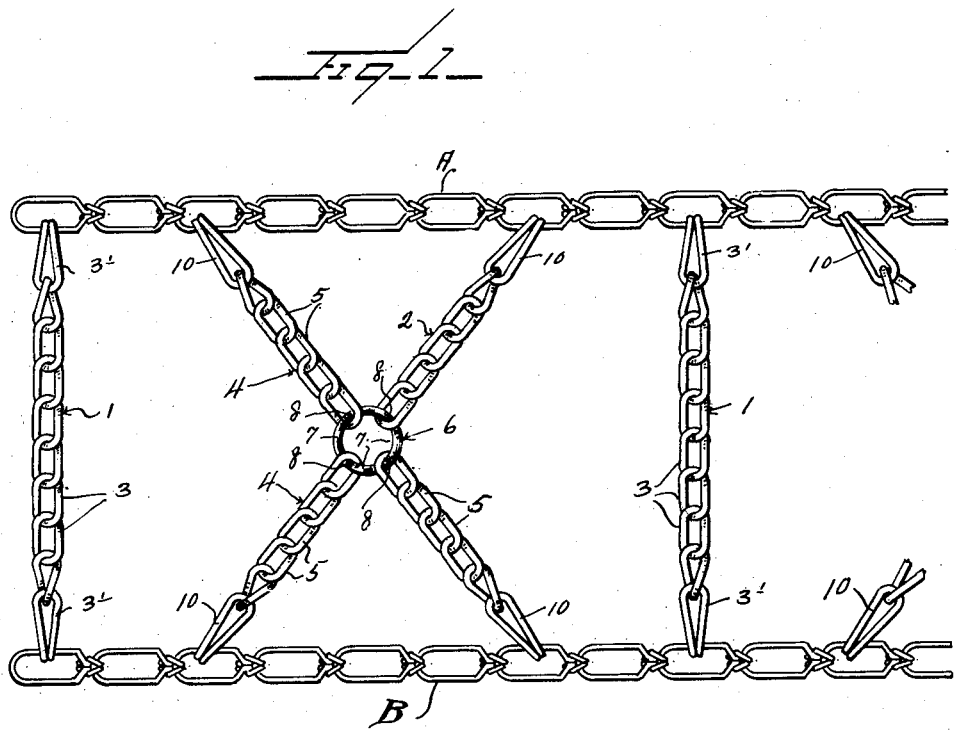
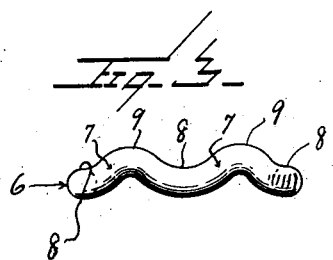
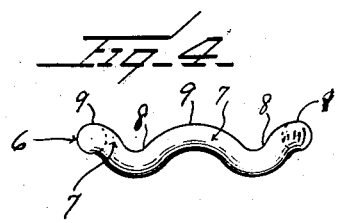
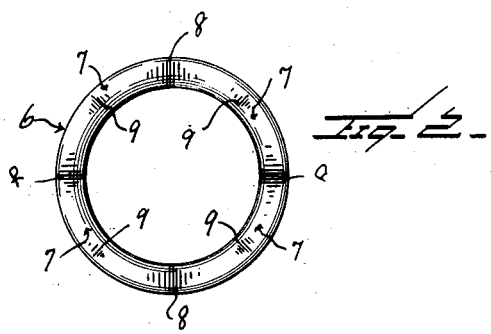
INVENTOR.
A. C. Rankin
BY Watson E. Coleman
ATTORNEY.

Patented Dec. 15, 1925.

1,565,497

UNITED STATES PATENT OFFICE.

ALEXANDER CASWELL RANKIN, OF GREENEVILLE, TENNESSEE.

ANTISKID DEVICE.

Application filed March 4, 1924. Serial No. 696,849.

*To all whom it may concern:*

Be it known that I, ALEXANDER CASWELL RANKIN, a citizen of the United States, residing at Greeneville, in the county of Greene and State of Tennessee, have invented certain new and useful Improvements in Antiskid Devices, of which the following is a specification, reference being had to the accompanying drawings.

This invention relates to certain improvements in anti-skid devices and has relation more particularly to a device of this general character especially designed and adapted for use as a tire chain, and it is an object of this invention to provide novel and improved means whereby the wheels of a vehicle are prevented from skidding on wet or slippery surfaces. Another object of this invention is to provide a device of this general character having means whereby the side slipping of the wheels of a vehicle is prevented.

A further object of this invention is to provide a device of this general character having means for increasing the tractive contact between the wheels of a vehicle and the ground.

The invention consists in the details of construction and in the combination and arrangement of the several parts of my improved device whereby certain important advantages are attained and the device rendered simpler, less expensive, and otherwise more convenient and advantageous for use, as will be hereinafter more fully set forth.

The novel features of my invention will hereinafter be definitely claimed.

In order that my invention may be the better understood, I will now proceed to describe the same with reference to the accompanying drawings, wherein it will be understood that various changes and modifications may be made as to the detailed construction and arrangement of parts without departing from the spirit of the invention as hereinafter claimed, and in which drawings:—

Figure 1 is a fragmentary plan view of my improved device;

Figure 2 is a plan view of the circular member;

Figure 3 is an elevation of the circular member;

Figure 4 is an elevation of the circular member at an angle of 45 degrees to Figure 3.

With reference to the accompanying drawings, A and B denote parallel side chains of an anti-skid device constructed in accordance with and embodying my invention. The compete device comprises a plurality of like sections disposed in spaced relation circumferentially around the tire of a wheel, all of the sections being placed between and connected to the side chains.

Each of the several sections comprises a cross-chain unit 1 and a diagonal chain unit 2. The cross-chain unit comprises a plurality of interconnected curb links 3 disposed transversely across the tread of the tire and connected to the side chains by the elongated end links 3'.

The diagonal chain unit comprises the diagonal chains 4 constructed from a plurality of interconnected curb links 5, the inner end links of the diagonal chains being connected to a circular ring 6 at the center of the tire tread. The ring 6 is undulated to provide offsets 7 spaced at intervals around its circumference with notches 8 therebetween adapted to engage the inner end links of the chains 4 and outwardly extending projections 9 forming ground engaging means. The chains 4, radiating from the ring 6, terminate at their outer ends in the elongated links 10 adapted to connect said chains with the side chains A and B.

The elongated links 3' and 10, forming the outer end links of the cross and diagonal chains, are connected to separate links of the side chains and in spaced relation to each other.

In assembly, the sections are so disposed between the side chains A and B as to bring the cross-chain of one section adjacent to the diagonal chain unit of the adjoining section to provide a continuous alternation of the cross and diagonal chain units around the circumference of the tire.

When in operation, the cross-chain units provide anti-skid means adapted to prevent skidding of the vehicle in a longitudinal direction, the diagonal chain units act to prevent side slipping as well as longitudinal skidding, and the offset projections of the central rings furnish additional anti-skid and anti-slip means.

I claim:—

An anti-skid device comprising side chains, a plurality of like sections disposed between said side chains, each of said sections consisting of two units, one of said units comprising a circular member disposed intermediately between said side chains and diagonal chains leading therefrom and connected at their inner ends thereto, the outer ends of the diagonal chains being separately secured to individual links of the side chains, said circular member being undulated to provide offsets with notches therebetween for engaging the inner end links of the diagonal chains and to provide ground engaging means between said links, said diagonal chains to provide anti-skid and anti-slip means, and a cross chain connecting the side chains at a point substantially midway between each pair of adjacent sets of diagonal chains, said cross chain being spaced from said adjacent pairs of diagonal chains.

In testimony whereof I hereunto affix my signature.

ALEXANDER C. RANKIN.